(12) United States Patent
Seo

(10) Patent No.: US 8,660,350 B2
(45) Date of Patent: Feb. 25, 2014

(54) IMAGE SEGMENTATION DEVICES AND METHODS BASED ON SEQUENTIAL FRAME IMAGE OF STATIC SCENE

(75) Inventor: Su Young Seo, Suseong-gu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 202 days.

(21) Appl. No.: 13/137,454

(22) Filed: Aug. 17, 2011

(65) Prior Publication Data
US 2012/0201460 A1 Aug. 9, 2012

(30) Foreign Application Priority Data
Feb. 8, 2011 (KR) .................. 10-2011-0010953

(51) Int. Cl.
*G06K 9/00* (2006.01)
*G06K 9/34* (2006.01)
(52) U.S. Cl.
USPC .......................................... 382/173; 382/190
(58) Field of Classification Search
USPC ................ 382/103, 128, 131, 173, 180, 190;
348/47, 143, 155, E13.074
See application file for complete search history.

(56) References Cited

U.S. PATENT DOCUMENTS

| 7,336,803 | B2 * | 2/2008 | Mittal et al. | 382/103 |
|---|---|---|---|---|
| 8,150,113 | B2 * | 4/2012 | Ray et al. | 382/128 |
| 2005/0104964 | A1 * | 5/2005 | Bovyrin et al. | 348/155 |
| 2009/0074246 | A1 * | 3/2009 | Distante et al. | 382/103 |
| 2010/0002925 | A1 * | 1/2010 | Kiraly et al. | 382/131 |
| 2012/0201460 | A1 * | 8/2012 | Seo | 382/180 |
| 2012/0287247 | A1 * | 11/2012 | Stenger et al. | 348/47 |

FOREIGN PATENT DOCUMENTS

| JP | 2001043380 A | 2/2001 |
|---|---|---|
| KR | 100143150 | 4/1998 |
| KR | 1020010105382 | 11/2001 |
| KR | 1020100033712 | 3/2010 |
| KR | 1020100091864 | 8/2010 |

OTHER PUBLICATIONS

Journal of Korea Spatial Information Society, vol. 18, No. 3, (pp. 73-83), Aug. 2010.
Su Young Seo et al., "Image Segmentation based on Statistics of Sequental Frame Imagery of a Static Scene," *Korea Spatial Information System Soc.*, vol. 18, No. 3, pp. 73-88 (2010)—paper in Korean with English abstract.

* cited by examiner

*Primary Examiner* — Amir Alavi
(74) *Attorney, Agent, or Firm* — Harness, Dickey & Pierce, P.L.C.

(57) ABSTRACT

Provided is an image segmentation device and method based on a sequential frame image of a static scene. The image segmentation device includes an image extraction unit, a seed point detection unit, and an image segmentation unit. The image extraction unit extracts a plurality of sequential frame images from a static scene, and calculates an average and standard deviation of each corresponding pixel. The seed point detection unit extracts a seed point with the average and standard deviation of each pixel calculated by the image extraction unit. The image segmentation unit generates a segmentation image through labeling by a region growing technique, based on the seed point. The image segmentation method captures a sequential frame of a static scene to generate an average and standard deviation of each pixel in the sequential frame and an average image, extracts a seed point with the generated average and standard deviation, and labels a plurality of pixels adjacent to the seed point in a region growing technique which bundles the same regions by allocating a label.

8 Claims, 10 Drawing Sheets
(4 of 10 Drawing Sheet(s) Filed in Color)

Fig. 3
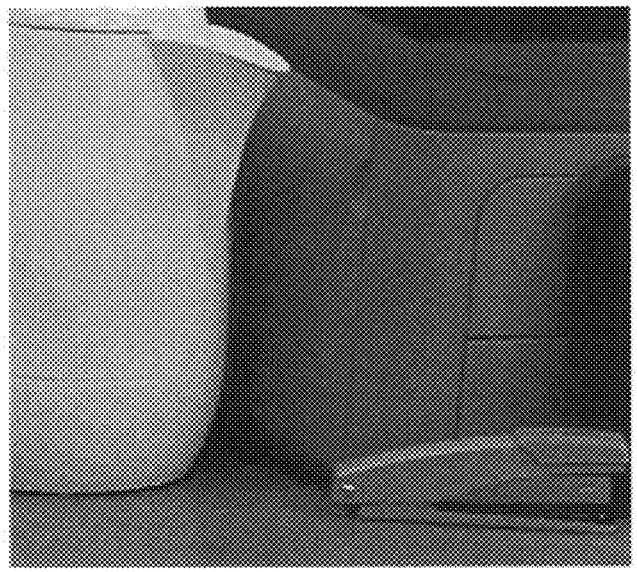
(a)
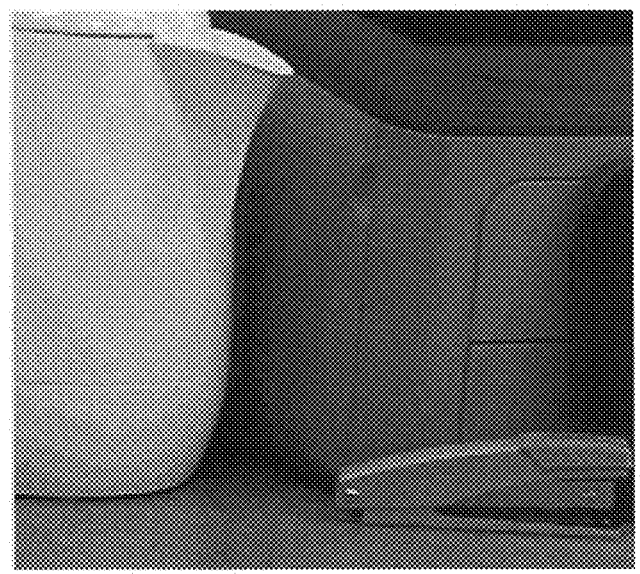
(b)

Fig. 5
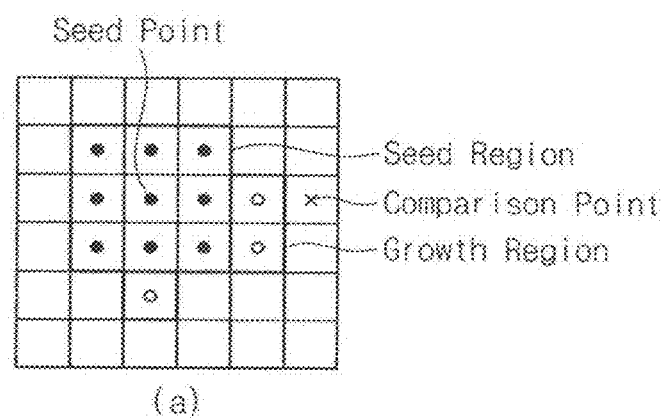
(a)
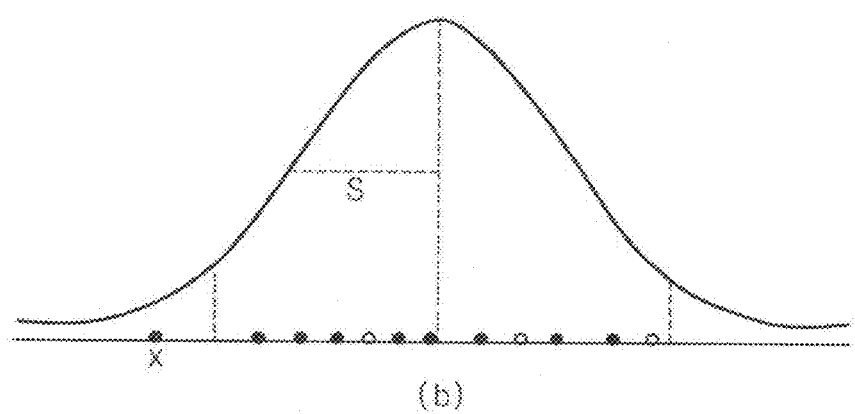
(b)

Fig. 7
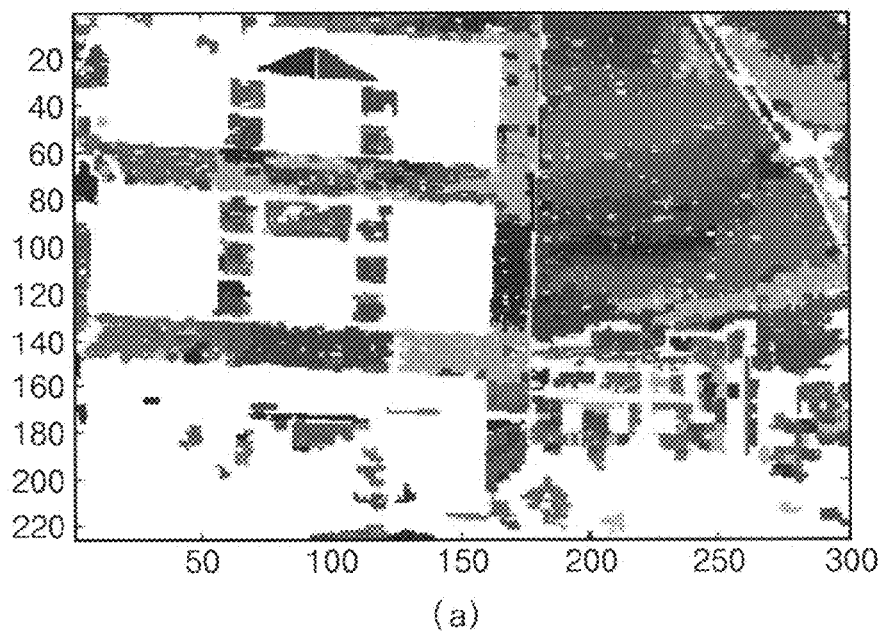
(a)
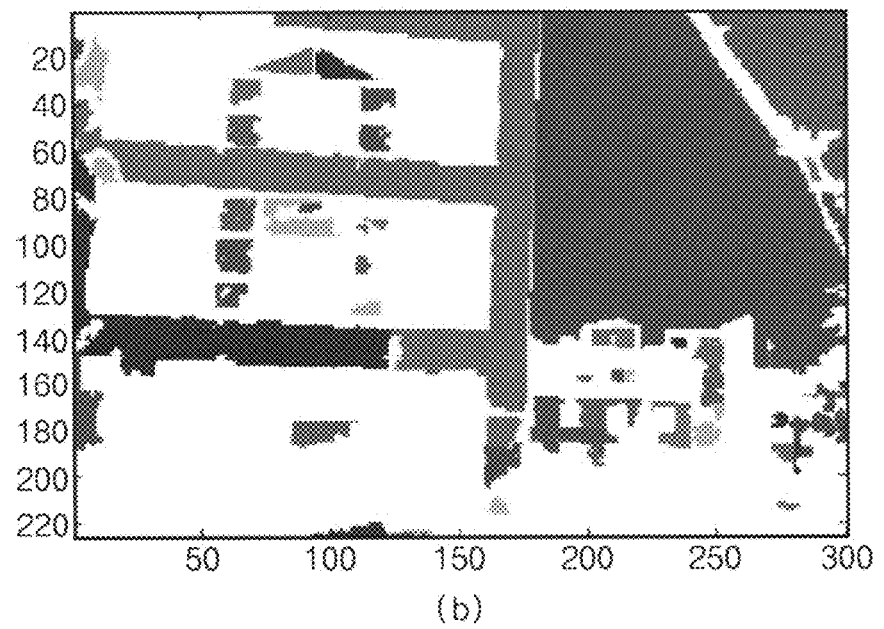
(b)

IMAGE SEGMENTATION DEVICES AND METHODS BASED ON SEQUENTIAL FRAME IMAGE OF STATIC SCENE

CROSS-REFERENCE TO RELATED APPLICATIONS

This U.S. non-provisional patent application claims priority under 35 U.S.C. §119 of Korean Patent Application No. 10-2011-0010953, filed on Feb. 8, 2011, the entire contents of which are hereby incorporated by reference.

BACKGROUND OF THE INVENTION

Example embodiments of the inventive concepts disclosed herein relate to an image segmentation device and method for segmentation an image, and more particularly, to an image segmentation device and method based on a sequential frame image of a static scene.

An image is composed of three signals of red (R), green (G) and blue (B), and in segmenting an image, the same color region or object region is extracted from an image including an input color signal. Such image extraction data may be usefully used in fields associated with digital image processing such as image analysis and image detection for object-based image information processing. Most image region segmentation methods based on a color signal project an input color signal onto different color spaces to extract the degree of concentration thereof, or segment an image into a plurality of regions on the basis of spatial contiguity between color pixels in the image region. More specifically, as image segmentation methods, there are an edge detection segmentation method, a segmentation method using a threshold value, a segmentation method based on a region, and a segmentation method based on motion. Particularly, a region growing technique is an image segmentation method based on a region, and segments an image into a plurality of regions in a scheme that detects a seed point with respect to each region and determines whether peripheral pixels and the seed point may be included in the same region according to a relationship between the seed point and neighbor pixels thereof. In segmenting an image, however, main concern is the over-segmentation of one region. Over-segmentation denotes that an image is excessively segmented to an undesired region. To prevent such over-segmentation, it is required to set an appropriate reference for the growing and merging of regions, and simultaneously, the sizes of the regions are required to be considered. Image segmentation methods based on such region growing technique are relatively excellent in performance and simply realized, but have limitations in that it is difficult to set an accurate segmentation reference for the progressive change of brightness intensity as in a shadow portion in an actual photograph, and image segmentation is affected by noise. That is, the existing region growing technique using a single frame is vulnerable to noises. To reduce such noises, a method is used where an operation of comparing a region and a peripheral pixel uses only a statistic value based on the average of regions and a peripheral single pixel, but is insufficient to reduce noises and secure reliability.

SUMMARY OF THE INVENTION

The exemplary embodiments provide an image segmentation device and method, which can decrease over-segmentation and realize the excellent segmentation of an image in performance according to a certain reference defined by a user, in segmenting a region of the image.

The exemplary embodiments also provide an image segmentation device and method, which can reduce the influence of noise in segmenting an image, thereby realizing image segmentation with secured reliability.

Embodiments of the inventive concepts provide an image segmentation device based on a sequential frame image of a static scene including: an image extraction unit extracting a plurality of sequential frame images from a static scene, and calculating an average and standard deviation of each corresponding pixel; a seed point detection unit extracting a seed point with the average and standard deviation of each pixel calculated by the image extraction unit; and an image segmentation unit generating a segmentation image through labeling by a region growing technique, based on the seed point.

In some embodiments, the image segmentation unit may perform T-test to generate the segmentation image through labeling.

In other embodiments, the image extraction unit may include: a first calculation module calculating the average and standard deviation of each pixel; a second calculation module calculating a standard deviation of a kernel region; and an average image generation module generating an average image frame with the average of a pixel calculated by the first calculation module.

In still other embodiments, the second calculation module may calculate a standard deviation value between an individual pixel in the kernel region being a 3×3 pixel group and eight pixels adjacent to the individual pixel.

In even other embodiments, the seed point detection unit may detect a pixel, where the standard deviation calculated by the first calculation module and the standard deviation calculated by the second calculation module are less than a predetermined seed point threshold value, as a seed point.

In yet other embodiments, the image segmentation unit m may include: a label generation module generating a plurality of labels; and a region boundary extraction module generating a group of labels having the same value among the generated labels, and extracting a boundary between regions. Herein the label generation module may calculate a T-test value expressed as Equation below, based on the seed point, and generate the labels when the test value is within a significant level $$t = \frac{(X - Y)}{\sqrt{\frac{Sx^2}{n} + \frac{Sy^2}{m}}}$$

where X indicates n number of pixel population average, Y indicates m number of pixel population average, Sx indicates n number of pixel standard deviation, and Sy indicates m number of pixel standard deviation.

In other embodiments of the present invention, an image segmentation method based on a sequential frame image of a static scene includes: capturing a sequential frame of a static scene to generate an average and standard deviation of each pixel in the sequential frame and an average image; extracting a seed point with the generated average and standard deviation; and labeling a plurality of pixels adjacent to the seed point in a region growing technique which bundles the same regions by allocating a label.

In some embodiments, the extracting of a seed point may include extracting a pixel, where the standard deviation of each pixel is less than a predetermined seed point threshold value, as a seed point.

In other embodiments, the extracting of a seed point may further include calculating a standard deviation value between an individual pixel in a kernel region being a 3×3 pixel group and eight pixels adjacent to the individual pixel to extract a pixel, having a standard deviation less than the seed point threshold value, as a seed point.

In still other embodiments, the seed point threshold value may be a limit point in extracting a seed point, and changed according to a state of a target image and a purpose for segmenting an image.

In even other embodiments, the labeling of a plurality of pixels may include performing T-test, which determines similarity between adjacent pixels in performing the region growing technique, to label adjacent pixels having a value which is within a predetermined significant level.

In yet other embodiments, the image segmentation method may include finding a seed point in another region, increasing a label by one to allocate the increased label, performing T-test for the region, and labeling adjacent pixels having a value which is within the predetermined significant level, when the labeling of adjacent pixels is completed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings are included to provide a further understanding of the example embodiments of the inventive concepts, and are incorporated in and constitute a part of this specification. The drawings illustrate exemplary embodiments and, together with the description, serve to explain principles of the inventive concepts. In the drawings:

FIG. 3A is an actual photograph of a single frame image;

FIG. 3B is an actual photograph of an average image;

FIG. 5A-B is a diagram illustrating a region which has been grown in a single frame;

FIG. 7A-B is diagrams illustrating a result of region segmentation based on the growing of a region in a single frame and a result of region segmentation based on the growing of a region in a sequential frame;

DETAILED DESCRIPTION OF PREFERRED EMBODIMENTS

Example embodiments of the inventive concepts will be described below in more detail with reference to the accompanying drawings. The embodiments of the inventive concepts may, however, be embodied in different forms and should not be constructed as limited to the embodiments set forth herein. Rather, these embodiments are provided so that this disclosure will be thorough and complete, and will fully convey the scope of the present invention to those skilled in the art. It will be understood that although the terms first and second are used herein to describe various elements, these elements should not be limited by these terms. These terms are only used to distinguish one element from another element.

Figure 1:
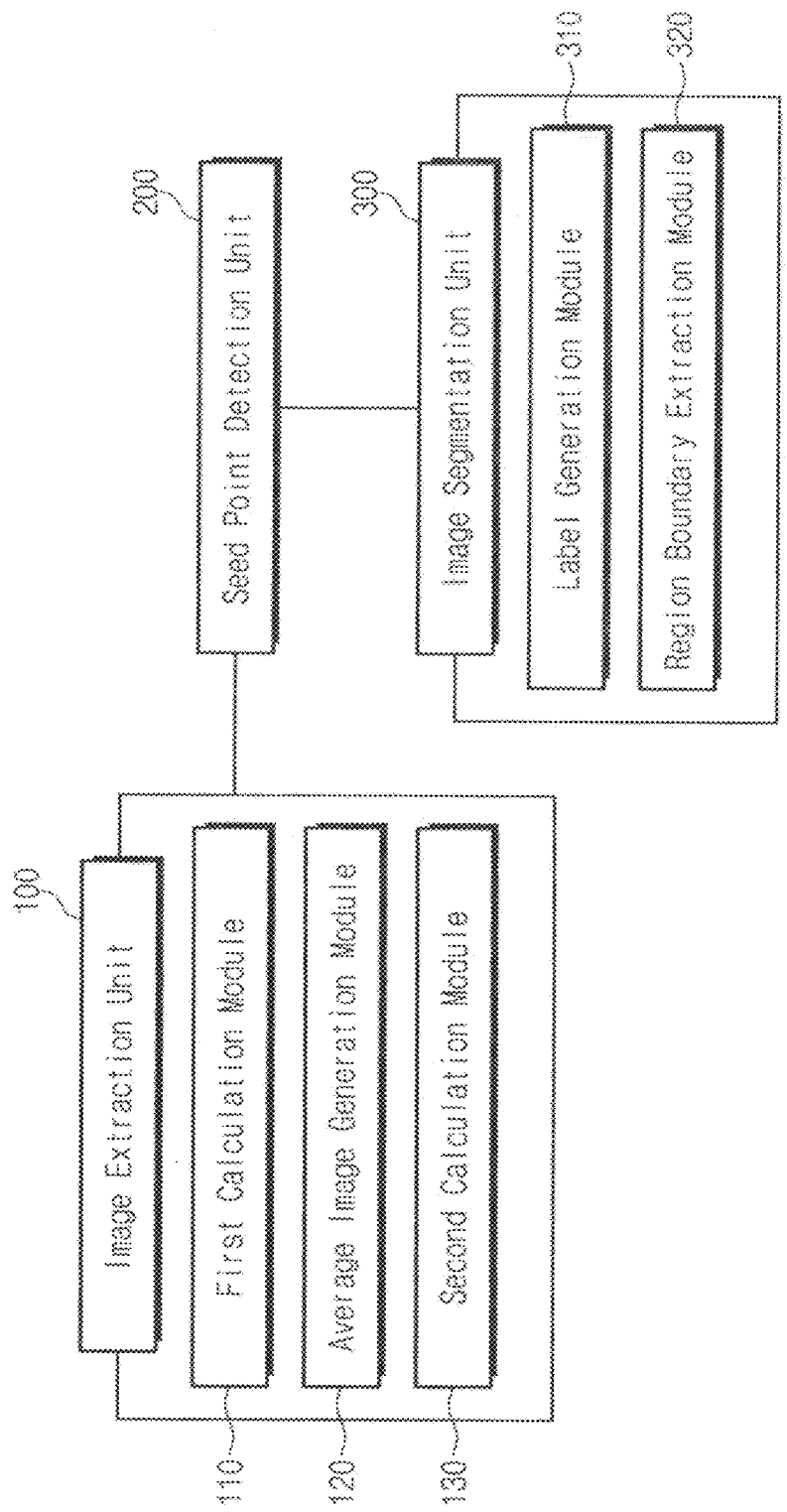
FIG. 1 is a block diagram illustrating an image segmentation device based on a sequential frame image of a static scene, according to an embodiment of the present invention.

FIG. 1 is a block diagram illustrating an image segmentation device based on a sequential frame image of a static scene, according to an embodiment of the inventive concept.

Referring to FIG. 1, an image segmentation device based on a sequential frame image of a static scene, according to an embodiment of the inventive concept, may include an image extraction unit 100, a seed point detection unit 200, and an image segmentation unit 300. The image extraction unit 100 may extract frame images of a static scene and calculate an average and standard deviation of each pixel. The seed point detection unit 200 may extract a seed point by using the average and standard deviation of each pixel calculated by the image extraction unit 100. The image segmentation unit 300 may perform T-test by using the seed point as a reference to generate a segmentation image through labeling. Herein, a numerical value, which becomes the basis in calculating the average and standard deviation of each pixel, denotes a brightness intensity value of each pixel.

The image extraction unit 100 may include a first calculation module 110 that calculates an average and standard deviation of each corresponding pixel in a sequential frame, an average image generation module 120 that reconfigures an image of the sequential frame on the basis of the average calculated by the first calculation module 110, and a second calculation module 130 that calculates a standard deviation of a kernel region.

The first calculation module 110 may calculate an average and standard deviation of a brightness intensity value of each corresponding pixel in the sequential frame. The average and standard deviation may be used to segment an image in consideration of randomness that occurs in the sequential frame. Particularly, an average image may be generated with the average value, and become an image that is based on the randomness occurring in the sequential frame and has high reliability. Furthermore, the standard deviation may be used as an indicator for determining a seed point for region growing, and the seed point and a seed region may be determined by comparing a predetermined seed point threshold value and the standard deviation.

Figure 2:
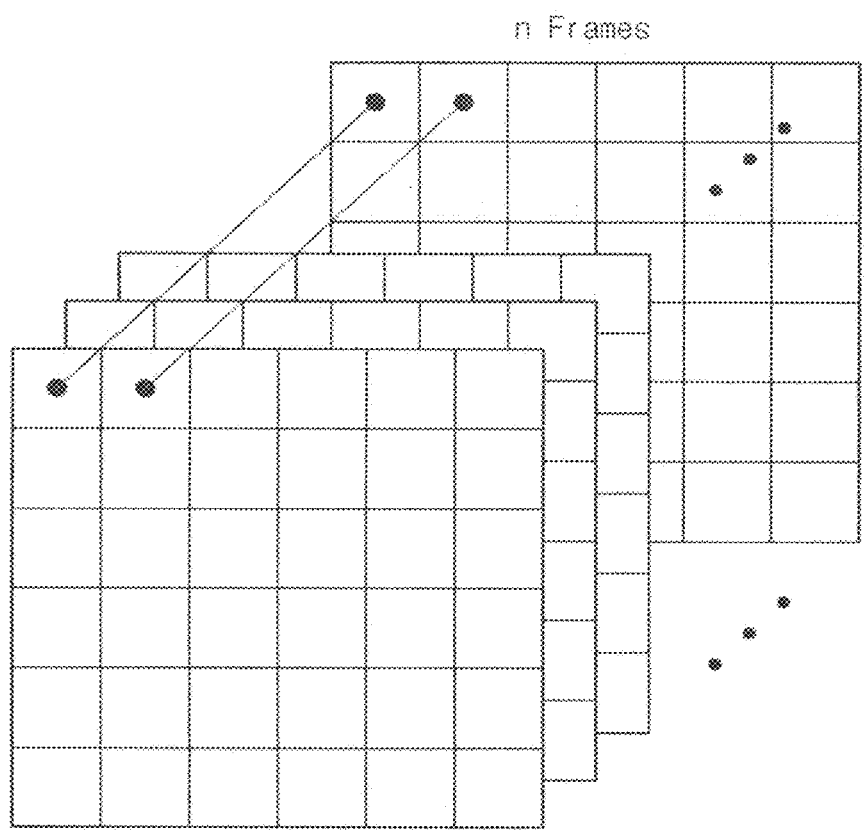
FIG. 2 is a diagram illustrating n number of sequential frames.

FIG. 2 is a diagram illustrating n number of sequential frames.

As illustrated in FIG. 2, the first calculation module 110 may calculate an average and standard deviation of brightness intensity values of pixels respectively corresponding to the n sequential frames.

$$\mu = \frac{\sum_{i=1}^{n} y_i}{n} \quad (1)$$

where μ indicates an average value, yi indicates a brightness intensity value of each pixel, and n indicates the number of frames.

$$\sigma = \sqrt{\frac{\sum_{i=1}^{n}(\mu - y_i)^2}{n-1}} \qquad (2)$$

The average image generation module 120 may be an element for generating an image that is configured by combining the average values of respective pixels calculated by the first calculation module 110.

The standard deviation calculated by the first calculation module 110 may enable the check of the change in the sequential inter-frame brightness intensity value, and may be a result that is obtained by considering randomness through calculating of a statistic value. According to the result, it can be seen that there is a difference of the change in a brightness intensity value for each pixel, due to randomness. Accordingly, as a numerical value of a standard deviation for between frame pixel becomes smaller, image segmentation is less affected by randomness and has high reliability.

FIG. 3A is an actual photograph of a single frame image. FIG. 3B is an actual photograph of an average image.

The photographs illustrated in FIG. 3 were captured using a 11 mm (⅔ type) color CCD, four color (RGBE) filter image device, and a lens having a resolution of 5,234×2,448, a focus length of 7.1 to 55 mm (35 mm conversion: 2.8 to 200 mm), an aperture of F2.0 to F2.8, and a filter diameter of 58 mm were used. Successive capture, which is a scheme of capturing the photographs, has been performed with a camera that has a frame speed of 0.38 sec and may successively capture images of a maximum of seven frames.

FIG. 3 shows images that are obtained by cutting a portion of an image which has successively been captured indoors and enlarging the cut portion. In FIG. 3, it can be seen that noises has considerably been reduced in an average image which is configured by combining the pixel averages of a successive image. The average image generation module 120, receiving the average image from the first calculation module 110, may realize an image on the basis of an average value of each pixel.

The second calculation module 130 may calculate a standard deviation of the kernel region. The second calculation module 130 may calculate a standard deviation between an individual pixel in the kernel region being a 3×3 pixel group and eight pixels adjacent to the individual pixel.

Figure 4:
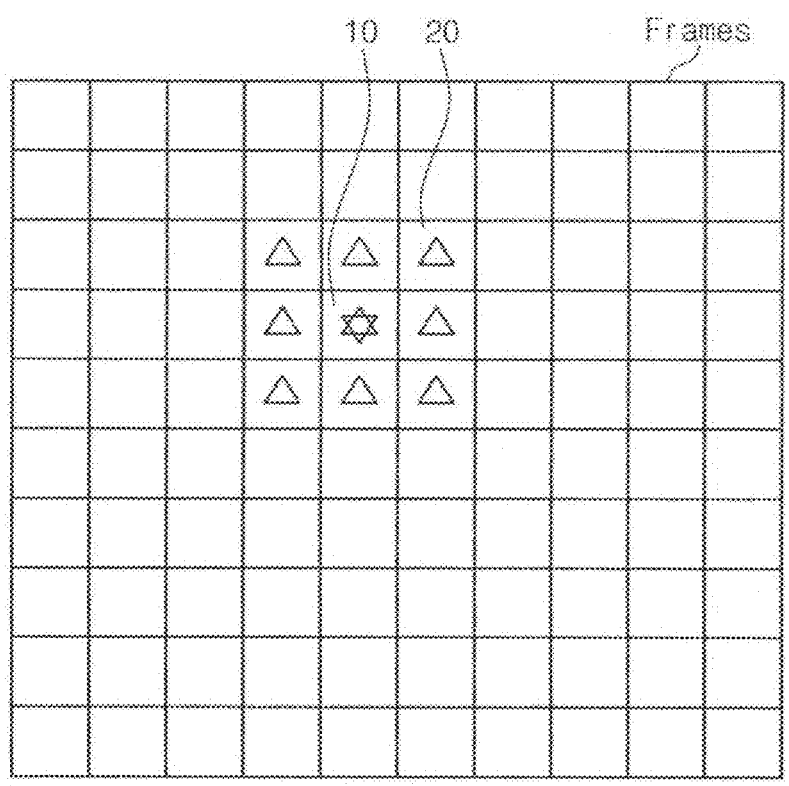
FIG. 4 is a diagram illustrating a kernel region in a frame.

FIG. 4 is a diagram illustrating a kernel region in a frame.

As illustrated in FIG. 4, the image extraction unit 100 may calculate all standard deviations between a central pixel 10 and eight pixels 20 adjacent thereto. When a central pixel being a reference of the kernel region is selected as a seed point, the kernel region becomes an initial seed region, and growing of a region is performed.

In order to secure reliability between adjacent pixels of the same frame and prevent a boundary portion from being determined as a seed point, in a conformal region of an image, the example embodiments may set a 3×3 kernel region for each pixel of the same frame in the original image and consider a standard deviation of each kernel. Accordingly, example embodiments may find a point that a standard deviation of an inter-frame pixel and a standard deviation of a 3×3 kernel region in the same frame have been calculated small.

The seed point detection unit 200 may detect a pixel, where the standard deviation values calculated by the first and second calculation modules 110 and 130 of the image extraction unit 100 are less than a predetermined seed point threshold value, as a seed point.

The seed point threshold value may be set by a user, and if the seed point threshold value is set too small, an extracted seed point becomes far smaller. As a result, a seed point may not exist in some regions, an unlabeled region may be formed. Also, when the seed point threshold value is set high, the number of extracted seed points may be increased, and thus, the segmentation of a region may be performed even in a fine portion. However, due to a seed point of a low-reliability portion, the segmentation of a region may be performed even in an undesired portion, and thus, there may be a possibility that over-segmentation will occur. Consequently, a seed point threshold value enabling appropriate segmentation may be required to be set according to a state of a target image and the user's requirement.

The image segmentation unit 300 may perform T-test based on the seed point to generate a segmentation image through labeling.

The image segmentation unit 300 may include a label generation module 310 and a region boundary extraction module 320. The label generation module 310 may calculate a T-test value, expressed as Equation (3) below, based on the seed point. When the T-test value is within a significant level, the label generation module 310 may generate labels. The region boundary extraction module 320 may generate a group of labels having the same value among the generated labels, and extract a region boundary.

$$t = \frac{(X - Y)}{\sqrt{\frac{Sx^2}{n} + \frac{Sy^2}{m}}} \qquad (3)$$

where X indicates n number of pixel population average, Y indicates m number of pixel population average, Sx indicates n number of pixel standard deviation, and Sy indicates m number of pixel standard deviation.

First, a method that grows a region by performing T-test in a single frame will be described below.

FIG. 5 is a diagram illustrating a region which has been grown in a single frame.

As illustrated in FIG. 5, the image segmentation unit 300 may set a 3×3 kernel region with a seed point as its center, and determine the set region as an initial seed region. The image segmentation unit 300 may calculate a kernel statistic value for the initial seed region, and grow a region by comparing a kernel region and neighbor pixels adjacent thereto.

T-test expressed as Equation (4) below may be performed on a seed point, seed region and grown region (being an adjacent pixel) of a single frame illustrated in a portion (a) of FIG. 5.

$$T = \sqrt{(N - 1)\frac{(y - X)^2}{(N + 1)S^2}} \qquad (4)$$

where N indicates the number of pixels in a region, y indicates the brightness intensity of a comparison point pixel, X indicates a population average of the brightness intensities of pixels in the region, and S indicates a standard deviation.

In the portion (a) of FIG. 5, the grown region is a pixel where a relationship between the predetermined significant level and a T value is "α>T". The T value may be calculated per adjacent pixel value in the seed region through Equation (4), and be compared the significant level "α" that has temporarily been set by the user. In a comparison point "x"

illustrated in the portion (a) of FIG. 5, the T value illustrated in a portion (b) of FIG. 5 is greater than the predetermine significant value. As a result, the comparison point "x" may not be included in the grown region of the seed region. As described above, the image segmentation device may calculate T values of pixels adjacent to the seed region for growing a region, repeatedly perform an operation of comparing the calculated T value and the significant level, and thus grow the seed region.

Figure 6:
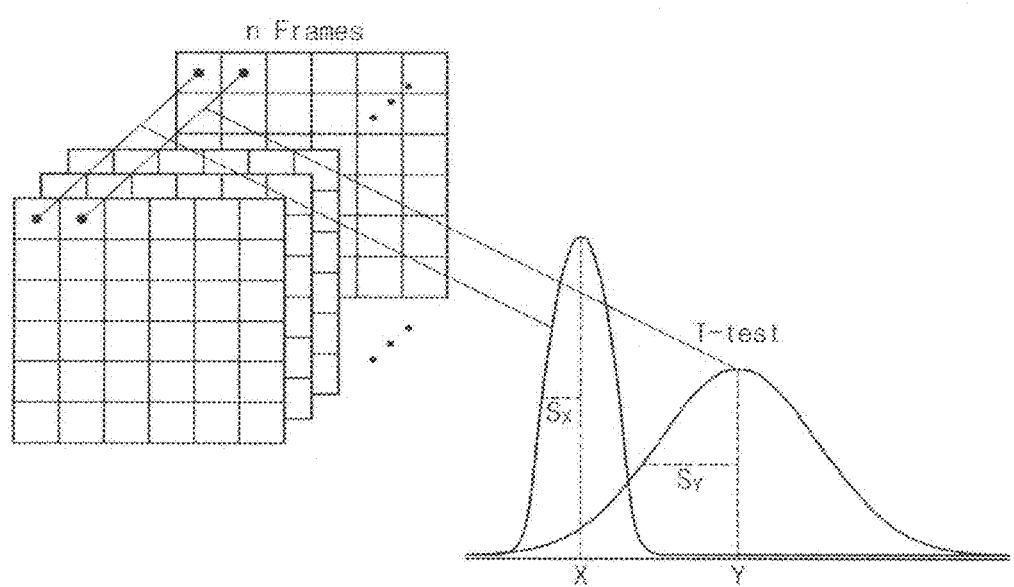
FIG. 6 is a diagram illustrating a region which is grown by performing T-test based on a sequential frame according to an embodiment of the inventive concept.

FIG. 6 is a diagram illustrating a region which is grown by performing T-test based on a sequential frame according to an embodiment of the inventive concept.

As illustrated in FIG. 6, the image segmentation device may calculate a t value for T-test by using Equation (3). When the t value is within the predetermined significant level, as described above, the image segmentation device may grow a region, but when the t value lies outside the predetermined significant level, a corresponding pixel may be excluded from the grown region. A label may be generated in a pixel corresponding to the grown region, and the image segmentation device may increase the number of grown regions. When there is no longer a region to be grown, the image segmentation device stops the growing of a region, may find another seed point, and start the growing of a region in another region. The image segmentation device may increase the existing label by one to allocate the label, and then perform the growing of a region for a corresponding region.

When a label of the same value is formed by performing the growing of a region based on the seed point, a label group may be generated. The image boundary extraction module 320 may extract a region boundary to generate an image with segmented regions.

A portion (a) of FIG. 7 is a diagram illustrating a result of region segmentation based on the growing of a region in a single frame. A portion (b) of FIG. 7 is a diagram illustrating a result of region segmentation based on the growing of a region in a sequential frame.

Figure 8:
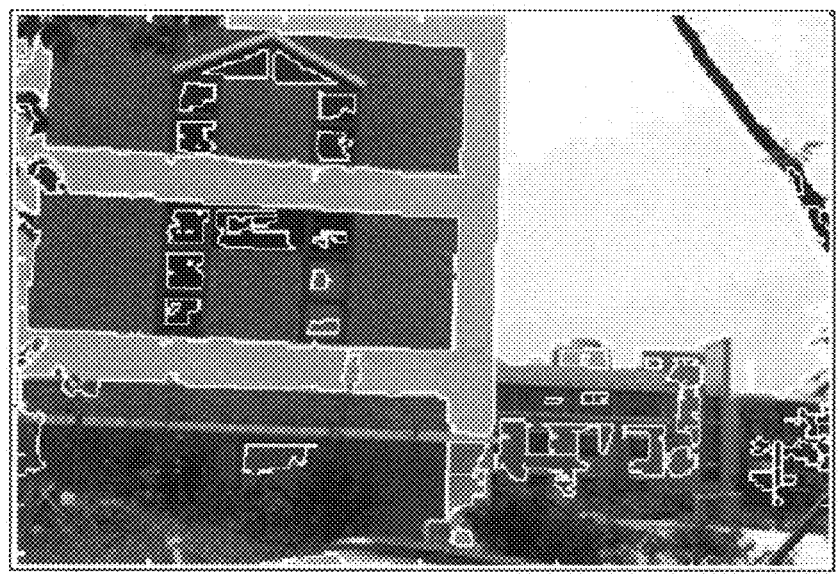
FIG. 8 is a diagram which is obtained by combining an actual photograph and segmented regions based on the growing of a region in a sequential frame.

FIG. 8 is a diagram which is obtained by combining an actual photograph and segmented regions based on the growing of a region in a sequential frame.

The portion (a) of FIG. 7 illustrates a result of image segmentation based on a single frame. A seed point threshold setting value is set to 3.5, and a significant level is set to 0.05. In such set state, an image is segmented, and thus the result is obtained.

The portion (b) of FIG. 7 illustrates a result of image segmentation based on a sequential frame. A seed point threshold setting value is set to 1.5, and a significant level is set to 0.05. In such set state, an image is segmented, and thus the result is obtained.

As illustrated in FIG. 7, an image illustrated in the portion (a) of FIG. 7 has more sensitively reacted on a fine change than a case using the sequential frame at the significant level. However, it is checked that the segmentation of the region has not clearly been performed and over-segmentation has excessively been performed even in a conformal region. Unlike this, in the portion (b) of FIG. 7, it can be checked that different labels have been allocated to respective regions, and a white region is a region to which a label has not been allocated because there is no seed point or an area where the size of a region is less than five pixels. In the segmentation of a region according to an embodiment of the inventive concept, to decrease over-segmentation factors, a region having a size equal to or less than total five pixels among total segmented regions has been set not to generate a label. Particularly, since a non-conformal region has a large standard deviation, it can be checked that a label has not been allocated to the non-conformal region.

As illustrated in FIG. 8, the segmentation of a region is ended, and when combining a label image and the original image, it can be seen that a boundary between regions is relatively clearly shown and not affected by noise.

Figure 9:
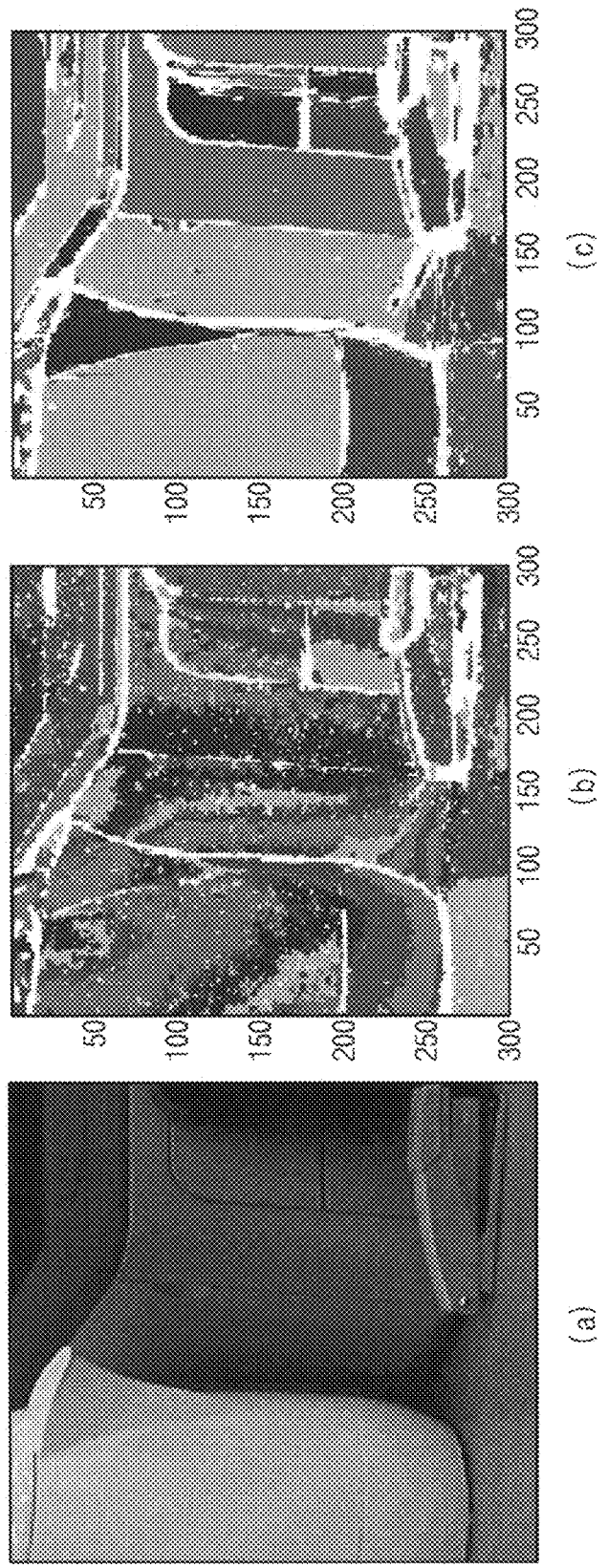
FIG. 9A-C is diagrams illustrating respective results which have been obtained by performing the segment of a region for an original image, a single frame, and a sequential frame.

A portion (a) of FIG. 9 is a diagram illustrating a result which has been obtained by performing the segment of a region for the original image. A portion (b) of FIG. 9 is a diagram illustrating a result which has been obtained by performing the segment of a region for a single frame. A portion (c) of FIG. 9 is a diagram illustrating a result which has been obtained by performing the segment of a region for a sequential frame.

In each image with segmented regions illustrated in FIG. 9, the segmentation of a region in a single frame has been performed based on a seed point threshold value of 3.5 and a significant level of 0.03, and the segmentation of a region in a sequential frame has been performed based on a seed point threshold value of 3.5 and a significant level of 0.2. In the portion (c) of FIG. 9, as described above with reference to FIG. 7, it can be seen that a region segmentation boundary line is clearly shown when performing the segmentation of a region in the sequential frame and not affected by noise.

Hereinafter, an image segmentation method based on a sequential frame image of a static scene will be described in detail.

Figure 10:
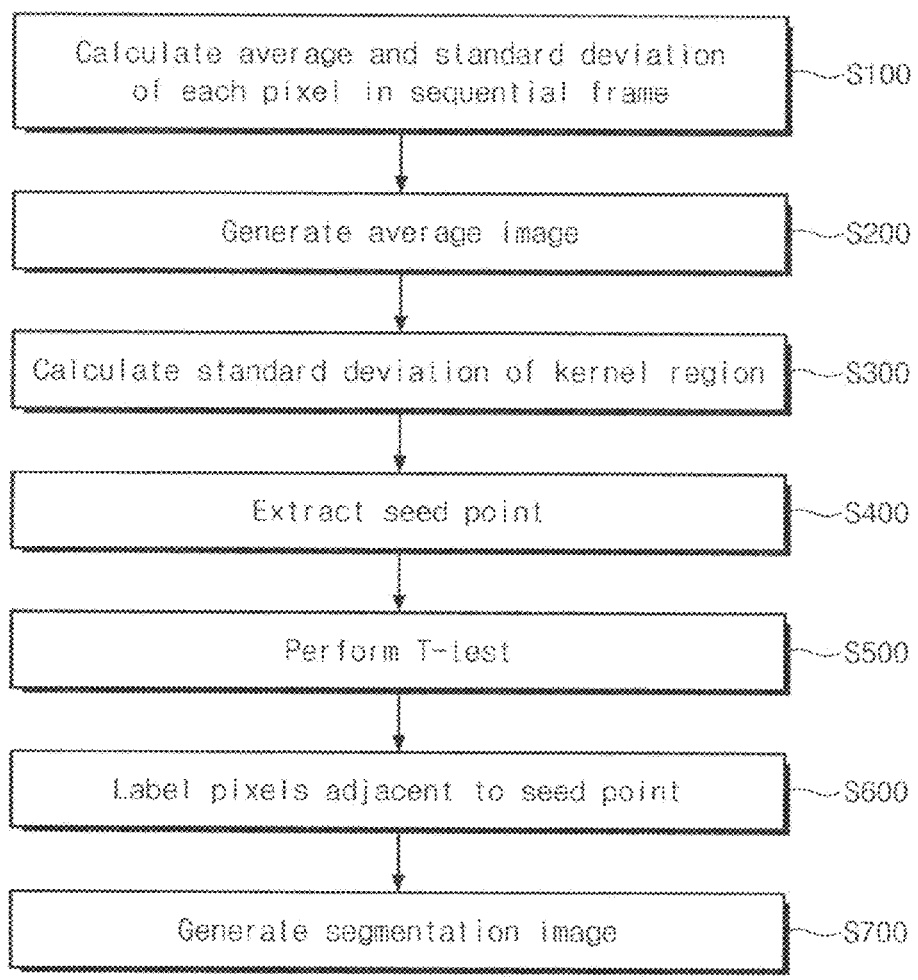
FIG. 10 is a flowchart illustrating an image segmentation method based on a sequential frame image of a static scene.

FIG. 10 is a flowchart illustrating an image segmentation method based on a sequential frame image of a static scene.

Referring to FIG. 10, the image segmentation method based on a sequential frame image of a static scene, according to an embodiment of the inventive concept, may calculate an average and standard deviation of each pixel in a sequential frame in operation S100, and generate an average image with the average value of each pixel in operation S200. The image segmentation method may calculate a standard deviation of a kernel region for extracting a seed point in operation S300, and extract the seed point in operation S400. The image segmentation method may perform T-test for the growing of a region on a pixel adjacent to the seed point in operation S500, generate a label for a pixel that lies within a significant level in operation S600, and generate a segmentation image in operation S700.

In operation S400 of extracting the seed point, the image segmentation method may extract a seed point for a pixel where the standard deviation of a pixel is less than a predetermined seed point threshold value. In this case, the seed point threshold value and the significant level may be changed according to a state of a target image and the purpose for segmenting an image.

According to the embodiments of the inventive concept, regions can be accurately segmented in an image. In segmenting an image into a plurality of regions, moreover, noises can be reduced, and thus, the reliability of segmentation can be secured.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An image segmentation device based on a sequential frame image of a static scene, the image segmentation device comprising:
    an image extraction unit configured to extract a plurality of sequential frame images from a static scene, and configured to calculate an average and standard deviation of each corresponding pixel;
    a seed point detection unit configured to extract a seed point with the average and standard deviation of each pixel calculated by the image extraction unit; and
    an image segmentation unit configured to generate a segmentation image through labeling by a region growth technique, based on the seed point,
    wherein the image extraction unit includes:
        a first calculation module configured to calculate the average and standard deviation of each pixel;
        a second calculation module configured to calculate a standard deviation of a kernel region; and
        an average image generation module configured to generate an average image frame with the average of a pixel calculated by the first calculation module.

2. The image segmentation device of claim 1, wherein the second calculation module calculates a standard deviation value between an individual pixel in the kernel region being a 3×3 pixel group and eight pixels adjacent to the individual pixel.

3. The image segmentation device of claim 1, wherein the seed point detection unit detects a pixel, where the standard deviation calculated by the first calculation module and the standard deviation calculated by the second calculation module are less than a predetermined seed point threshold value, as a seed point.

4. An image segmentation device based on a sequential frame image of a static scene, the image segmentation device comprising:
    an image extraction unit configured to extract a plurality of sequential frame images from a static scene, and configured to calculate an average and standard deviation of each corresponding pixel;
    a seed point detection unit configured to extract a seed point with the average and standard deviation of each pixel calculated by the image extraction unit; and
    an image segmentation unit generating a segmentation image through labeling by a region growth technique, based on the seed point,
    wherein the image segmentation unit includes:
        a label generation module configured to generate a plurality of labels; and
        a region boundary extraction module configured to generate a group of labels having the same value among the generated labels, and configured to extract a boundary between regions,
    wherein, the label generation module calculates a T-test value expressed as Equation below, based on the seed point, and generates the labels when the test value is within a significant level $$t = \frac{(X - Y)}{\sqrt{\frac{Sx^2}{n} + \frac{Sy^2}{m}}}$$

where X indicates n number of pixel population average, Y indicates m number of pixel population average, Sx indicates n number of pixel standard deviation, and Sy indicates m number of pixel standard deviation.

5. An image segmentation method based on a sequential frame image of a static scene, the image segmentation method comprising:
    capturing a sequential frame of a static scene to generate an average and standard deviation of each pixel in the sequential frame and an average image;
    extracting a seed point with the generated average and standard deviation; and
    labeling a plurality of pixels adjacent to the seed point in a region growth technique which bundles the same regions by allocating a label,
    wherein the extracting of a seed point comprises extracting a pixel, where the standard deviation of each pixel is less than a predetermined seed point threshold value, as a seed point.

6. The image segmentation method of claim 5, wherein the extracting of a seed point further comprises calculating a standard deviation value between an individual pixel in a kernel region being a 3×3 pixel group and eight pixels adjacent to the individual pixel to extract a pixel, having a standard deviation less than the seed point threshold value, as a seed point.

7. The image segmentation method of claim 5, wherein the seed point threshold value is a limit point in extracting a seed point, and is changed according to a state of a target image and a purpose for segmenting an image.

8. The image segmentation method of claim 5, wherein the labeling of a plurality of pixels comprises performing t-test, which determines similarity between adjacent pixels in performing the region growth technique, to label adjacent pixels having a value which is within a predetermined significant level; and
    finding a seed point in another region, increasing a label by one to allocate the increased label, performing t-test for the region, and labeling adjacent pixels having a value which is within the predetermined significant level, when the labeling of adjacent pixels is completed.

* * * * *